(12) United States Patent
Dreossi et al.

(10) Patent No.: US 10,105,031 B2
(45) Date of Patent: Oct. 23, 2018

(54) ARRANGEMENT FOR A DISHWASHER FOR CREATING A WASH ZONE WITH SELECTABLE POSITION

(71) Applicant: ELECTROLUX APPLIANCES AKTIEBOLAG, Stockholm (SE)

(72) Inventors: Giuseppe Dreossi, Stockholm (SE); Per-Erik Pers, Järfälla (SE)

(73) Assignee: Electrolux Appliances Aktiebolag, Stockholm (SE)

(*) Notice: Subject to any disclaimer, the term of this patent is extended or adjusted under 35 U.S.C. 154(b) by 39 days.

(21) Appl. No.: 15/037,523

(22) PCT Filed: Dec. 20, 2013

(86) PCT No.: PCT/EP2013/077769
§ 371 (c)(1),
(2) Date: May 18, 2016

(87) PCT Pub. No.: WO2015/090460
PCT Pub. Date: Jun. 25, 2016

(65) Prior Publication Data
US 2016/0296097 A1    Oct. 13, 2016

(51) Int. Cl.
*A47L 15/00* (2006.01)
*A47L 15/23* (2006.01)
(Continued)

(52) U.S. Cl.
CPC ........... *A47L 15/0018* (2013.01); *A47L 15/23* (2013.01); *A47L 15/428* (2013.01);
(Continued)

(58) Field of Classification Search
None
See application file for complete search history.

(56) References Cited

U.S. PATENT DOCUMENTS

| 4,174,723 A | 11/1979 | Long |
| 6,239,416 B1 | 5/2001 | Nomura et al. |

(Continued)

FOREIGN PATENT DOCUMENTS

| CN | 1 117 601 A | 2/1996 |
| DE | 12 91 869 B | 4/1969 |

(Continued)

OTHER PUBLICATIONS

JP2009273490 English Translation. Accessed on Sep. 2017.*
(Continued)

*Primary Examiner* — Eric Wayne Golightly
*Assistant Examiner* — Arlyn I Rivera-Cordero
(74) *Attorney, Agent, or Firm* — Alston & Bird LLP

(57) ABSTRACT

Provided herein is an arrangement for a dishwasher for creating a wash zone with a selectable position within a washing chamber of the dishwasher. The arrangement may include a water spray arm rotatably arranged around an axis in the washing chamber, and a support element arranged to support the spray arm in the washing chamber. The support element may lock the spray arm in at least one position within the washing chamber. The arrangement may include a control unit arranged to control the operation of the dishwasher and a user interface for selecting the desired wash zone position within the washing chamber, and arranged to communicate the information to the control unit. The control unit may lock the support element in the selected position to create the wash zone. A dishwasher that includes the arrangement and a method for creating a wash zone with a selectable position are provided.

11 Claims, 3 Drawing Sheets

(51) Int. Cl.
   *A47L 15/42*  (2006.01)
   *B08B 7/04*   (2006.01)
   *B08B 9/20*   (2006.01)

(52) U.S. Cl.
   CPC ....... *A47L 15/4214* (2013.01); *A47L 15/4282* (2013.01); *A47L 2301/04* (2013.01); *A47L 2301/06* (2013.01); *A47L 2301/08* (2013.01); *A47L 2401/14* (2013.01); *A47L 2401/24* (2013.01); *A47L 2401/30* (2013.01); *A47L 2401/32* (2013.01); *A47L 2501/04* (2013.01); *A47L 2501/05* (2013.01); *A47L 2501/20* (2013.01)

(56) References Cited

U.S. PATENT DOCUMENTS

| | | |
|---|---|---|
| 6,263,888 B1 | 7/2001 | Nomura et al. |
| 2003/0168087 A1 | 9/2003 | Inui et al. |
| 2004/0103929 A1 | 6/2004 | Ha |
| 2009/0178698 A1 | 7/2009 | Delgado |
| 2012/0097199 A1 | 4/2012 | Tuller |
| 2012/0097200 A1 | 4/2012 | Fountain |
| 2012/0138110 A1 | 6/2012 | Chen et al. |
| 2013/0139854 A1 | 6/2013 | Lee et al. |
| 2013/0284216 A1 | 10/2013 | Förster et al. |

FOREIGN PATENT DOCUMENTS

| | | |
|---|---|---|
| DE | 10 2012 217 568 A1 | 3/2013 |
| EP | 1 040 486 A1 | 10/2000 |
| EP | 1040786 A1 | 10/2000 |
| EP | 1 238 622 A2 | 9/2002 |
| EP | 2 030 556 A1 | 3/2009 |
| GB | 2 253 341 A | 9/1992 |
| JP | 2009-273490 A | 11/2009 |
| JP | 2009273490 * 11/2009 | ............ A47L 15/46 |
| WO | WO 2013/132458 A1 | 9/2013 |

OTHER PUBLICATIONS

International Search Report for International Application No. PCT/EP2013/077768 dated Oct. 30, 2014.
International Search Report for International Application No. PCT/EP2013/077769 dated Sep. 11, 2014.
International Search Report for International Application No. PCT/EP2013/077770 dated Oct. 28, 2014.
Restriction Requirement from U.S. Appl. No. 15/037,525 dated Jun. 30, 2017, 9 pages.
Office Action from U.S. Appl. No. 15/037,529, dated Jul. 19, 2017, 18 pages.
Office Action for U.S. Appl. No. 15/037,525 dated Nov. 2, 2017, 16 pages.
Office Action European Patent Application No. 13819035.0 dated May 22, 2017.
Written Opinion for International Application No. PCT/EP2013/077768 dated Oct. 30, 2014, 5 pages.
Written Opinion for International Application No. PCT/EP2013/077769 dated Sep. 11, 2014, 8 pages.
Written Opinion for International Application No. PCT/EP2013/077770 dated Oct. 28, 2014, 6 pages.
Notice of Allowance for U.S. Appl. No. 15/037,529 dated Feb. 14, 2018, 12 pages.
Final Office Action for U.S. Appl. No. 15/037,529 dated Nov. 22, 2017, 18 pages.
English Translation of Russian Office Action No. 2016129427 dated Nov. 23, 2017, 2 pages.
Office Action for Chinese Application No. 201380081532.6 dated May 10, 2018, 8 pages.
Notice of Allowance for U.S. Appl. No. 15/037,525 dated Jul. 2, 2018

* cited by examiner

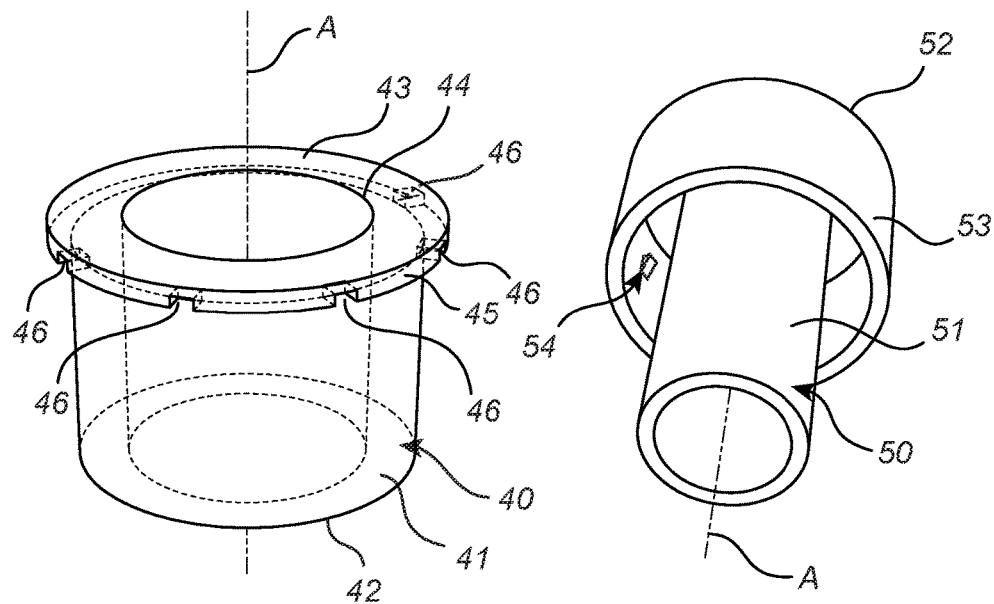
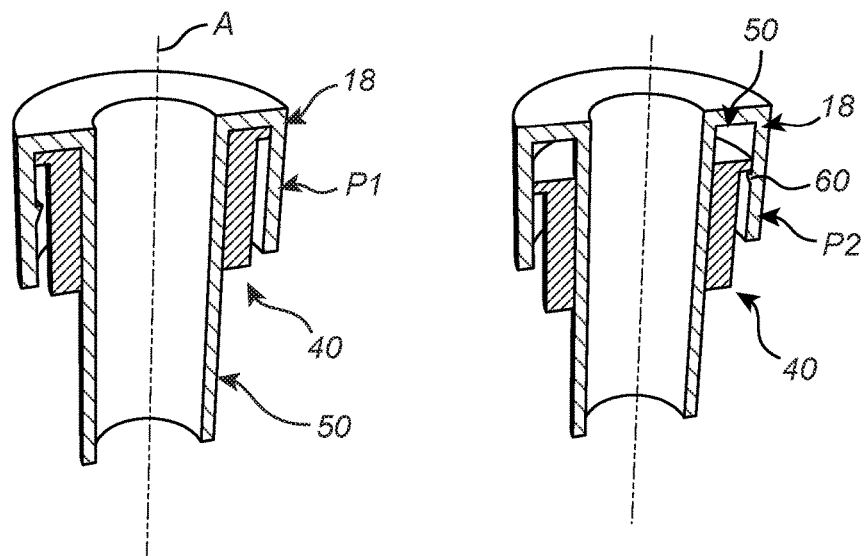

ARRANGEMENT FOR A DISHWASHER FOR CREATING A WASH ZONE WITH SELECTABLE POSITION

CROSS-REFERENCE TO RELATED APPLICATIONS

This application is a national stage application filed under 35 U.S.C. § 371 of International Application No. PCT/EP2013/077769 filed Dec. 20, 2013, which application is hereby incorporated by reference in its entirety.

FIELD OF THE INVENTION

The present invention relates to an arrangement in a dishwasher for creating a wash zone with selectable position within a washing chamber, a dishwasher comprising said arrangement and a method for creating a wash zone with selectable position.

BACKGROUND OF THE INVENTION

Dishwashers are used in domestic kitchens as well as professional kitchens and restaurants to facilitate the work related to dishing of used and dirty dishing goods such as for example plates, pots, pans etc. Dishwashers comprises a washing chamber in which the dishing goods are packed in one or more baskets to remain in the intended position separated from adjacent items to make it possible for water to circulate within the washing chamber and clean the dishing goods and increase the packing capacity of the dishwasher.

Water is circulated in the washing chamber by a pump arranged in the lower section of the washing chamber. The water is lead from the pump via pipes to one, or more, rotating spray arms arranged in the washing chamber and provided with a number nozzles that are spraying water on the dishing goods to clean the dishing goods. The rotating spray arm is furthermore provided with one or more nozzles arranged in the outer ends of the spray arm and directed sideways to generate the force required to rotate the spray arm around an axis A in the dishing chamber.

In order to adapt the dishwasher to new regulations regarding reduced energy consumption as well as reduced water consumption modern dishwashers have been provided with one or more wash zones, i.e. a selected area within the washing chamber where the amount of water sprayed on the dishing goods is higher to intensify the washing in the zone compared to the rest of the washing chamber. Thereby more dirty dishing goods requiring more intense washing could be arranged in the wash zone where the washing is more intense. The increased flow of water is either provided by adding additional nozzles on the inside wall of the wash chamber, alternatively adding a spray arm dedicated the wash zone to direct more water towards the wash zone and thereby optimizing the process and reduce the power consumption and/or water consumption. One example of dishwasher with the described arrangement is disclosed in US2012/0138110. The dishwasher comprises at least one auxiliary spray nozzle arranged on the side wall of a treating chamber to intensify the spraying of water on the dishing goods arranged in a selected part of a basket within the treating chamber.

The disclosed wash zone arrangement unfortunately requires a number of additional components which makes them expensive and complicated. Furthermore, in dishwashers with a dedicated wash zone it might be difficult to pack dishing goods with a large or complex design and still ensure the desired washing result, alternatively pack a several items requiring intense washing. There is consequently a need for a flexible arrangement that provides the desired intense wash zone but is less complicated, and less expensive to manufacture.

SUMMARY OF THE INVENTION

The present invention, defined in the appended claims, relates to an arrangement in a dishwasher for creating a wash zone with selectable position within a washing chamber that to at least some extent fulfils the needs defined above. The invention furthermore relates to a dishwasher comprising said arrangement and a method for creating a wash zone with selectable position.

The arrangement according to the invention comprises:
a water spray arm rotatably arranged around an axis A in the washing chamber;
a support element arranged to support the spray arm in the washing chamber, said support element is able to lock the spray arm in at least two different positions within the washing chamber;
a control unit arranged to control the operation of the dishwasher; and
a user interface for selecting the desired wash zone position within the washing chamber which user interface is arranged to communicate the selected wash zone position information to the control unit; wherein
the control unit is arranged to lock the support element in the selected position to create the wash zone.

The arrangement according to the invention makes it possible for the operator to select one, or more, areas within the washing chamber where an intense washing is desired. Based on the operator's selection, the control unit adapts the dishwasher program and locks the spray arm in the selected position where the intense washing is desired. The claimed arrangement is very advantageous since the operator is free to pack the most dirty dishing goods in any position within the washing chamber. Furthermore, if there are many items, or very large items, the area where intense washing is provided could be extended by selecting more than one position in the user interface. If more than one position are selected the control unit adapts the dishing program accordingly. Consequently, the claimed arrangement provides a very flexible arrangement that could be adapted to changing needs which in the end saves energy since the intense washing is used where it is needed.

One embodiment of the arrangement further comprises: a water pump arranged to feed water to the spray arm via the support element; position detection means arranged to detect the position of the spray arm around the axis A, said position detection means are connected to the control unit; wherein the pressure in the water fed from the water pump is controlled by the control unit and the support element is arranged to lock the spray arm in the selected position when the pressure in the water fed from the water pump exceeds a predetermined level.

This embodiment of the arrangement is very favourable since the support element makes it possible to control the rotation of the spray arm by increasing the speed of the pump and increase the pressure in the water flow such that once the predetermined pressure is achieved the spray arm is stopped in the selected position and the intense wash zone is created without adding a lot of components in the dishwasher.

In one embodiment of the arrangement, the control unit is arranged to control the water pump by increasing or reducing the speed of the pump to stop and start the rotation of the spray arm.

In one embodiment of the arrangement, the position detection means consist of an accelerometer, a microphone, a hall sensor or IR (image recognition) sensor that is arranged to detect the position of the spray arm around the axis A and communicate the information to the control unit. All these alternatives provide the desired information that is required to determine the position of the spray arm.

In one embodiment of the arrangement, the user interface is arranged to makes it possible to select one or more desired intense wash zones within the washing chamber.

In one embodiment of the arrangement, the selectable wash zones are arranged in a plane transverse to the axis A. This embodiment ensures a simple and reliable arrangement since the different selectable positions are arranged within the plane of the spray arm rotation.

In one embodiment of the arrangement, the user interface is a touch screen arranged to display a graphical symbol enabling the user to select the position of the wash zone. The touch screen makes it possible to clearly display the different possible positions where the intense washing is possible as well as make it easy for the operator to make the selection directly on the touch screen.

In one embodiment of the arrangement, the spray arm comprises a satellite spray device rotatably arranged on the spray arm. This embodiment is very favourable since the satellite spray device will continue to rotate and spray water within the selected wash zone.

The invention furthermore relates to a dishwasher comprising anyone of the embodiments of the arrangement defined above.

The invention furthermore relates to a method for creating a wash zone in a selectable position within a washing chamber of a dishwasher comprising a user interface for selecting operation program and wash zone position, a control unit and a spray arm, said method comprising the steps:
  a) communicating a selected position of at least one wash zone from the user interface to the control unit; and
  b) locking the spray arm in the selected position for a predetermined time.

The claimed method increases the flexibility of the dishwasher considerably since the operator is able to select the position, or positions, where the intense washing should be provided depending on the amount of dishing goods, the level of dirtiness and type of dishing goods packed in the dishwasher.

In one embodiment of the method step b) comprises the additional steps:
  b1) determine the position of the spray arm (8) around an axis A and communicate the position to the control unit (25);
  b2) increase the pressure in the flow of water fed to the spray arm (8) above a predetermined level to stop the spray arm (8) in the selected position;
  b3) maintain the pressure in the flow of water for a predetermined time.

In one embodiment of the method, during step b2) the control unit (25), based on predetermined information regarding the required time to accelerate a pump (19) arranged to feed water to the spray arm, calculates the time at which the pump (19) is activated to stop the spray arm (8) in the selected position.

The different embodiment described above could of course be combined and modified in different ways without departing from the scope of the invention that will be described more in detail in the detailed description.

BRIEF DESCRIPTION OF THE DRAWINGS

FIG. 3 discloses a perspective view of the first element of the support element.

FIG. 4 discloses a perspective view of the second element of the support element FIGS. 5a and 5b discloses the support element with the second element in the first respective second position.

DETAILED DESCRIPTION

Figure 1:
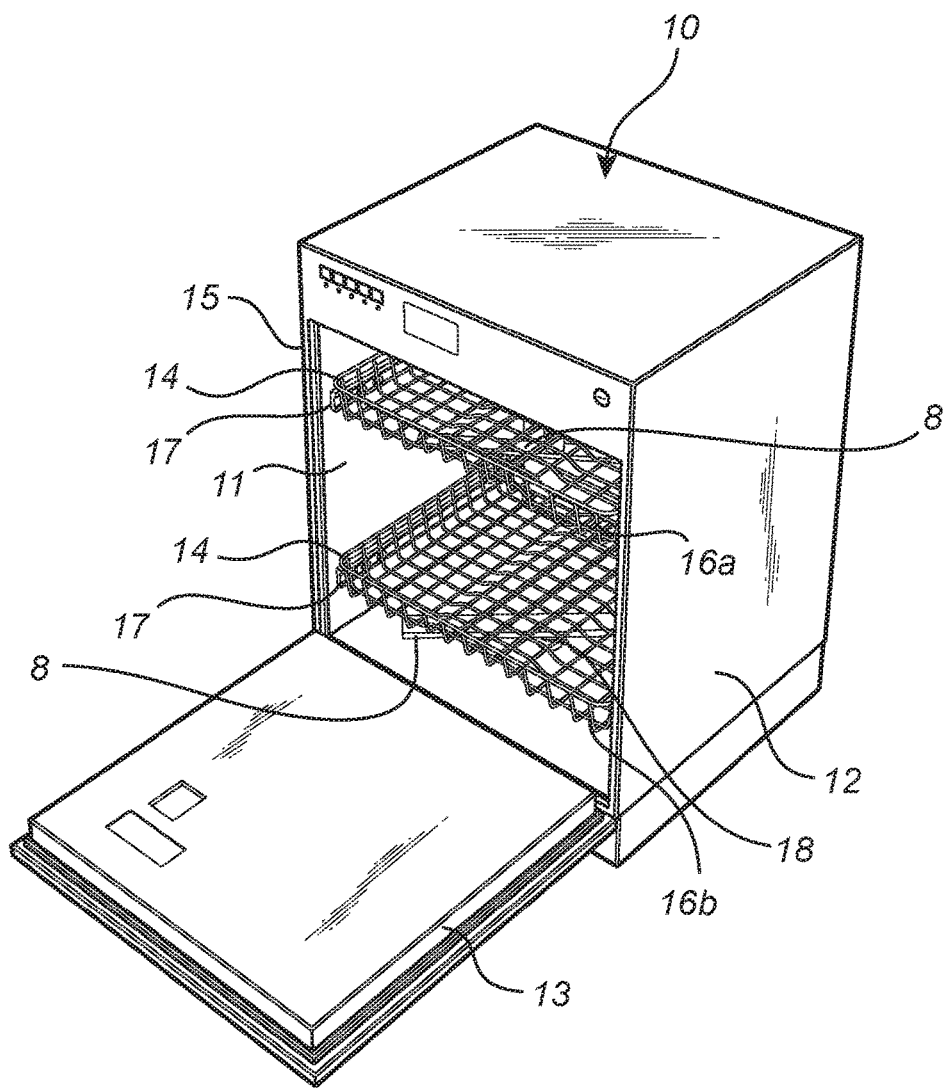
FIG. 1 discloses a schematic perspective view of a dishwasher.

In FIG. 1, a perspective schematic view of dishwasher 10 is illustrated. The dishwasher comprise a washing chamber 11 surrounded by a substantially rectangular cabinet 12. The washing chamber 11 comprises an opening 15 in the front side of the dishwasher in order to make the washing chamber 11 accessible during loading and unloading of items in and from the washing chamber. The opening 15 is closed by a door 13 in order to make it possible to access, and close, the opening 15 of the washing chamber 11. Within the washing chamber 11, an upper (16a) and lower basket 16b for dirty items are arranged at different heights. The baskets are extractably arranged in the washing chamber and formed of thin elements like for example wires or rods in order to provide a basket structure that the water could flow through easily. The dishwasher 10, illustrated in FIG. 1, comprises two wire baskets 16 arranged on guide rails 17. The lower one is normally used for larger dishing goods like plates, pots etc, and the upper one for cups, glasses and smaller items. The number of baskets could however be increased further to comprise for example a third basket for small dishing goods and cutleries arranged in the top of the washing chamber.

Heated water, in combination with detergent, is circulated in the washing chamber by a water circulating system comprising at least a water pump 19 arranged in the lower part of the washing chamber 11, i.e. the sump, where water is collected and recirculated within the washing chamber 11. The water pump 19 is connected to at least one rotating spray arm 8 arranged in the washing chamber 11.

The spray arm 11, schematically illustrated in FIG. 2, is rotatably arranged around a substantially vertical axis A arranged in the centre of the washing chamber 11 such that the spray arm is rotating in a substantially horizontal plane within the washing chamber 11. Depending on the size and design of the dishwasher the spray arm 8 is either arranged to rotate under a basket, or in an elevated position above the basket. However, dishwashers could be provided with several spray arms arranged at different heights within the washing chamber.

The spray arm 8 has an elongated shape to cover as large area as possible within the washing chamber 11 when it rotates to ensure that all dishing goods packed in the basket are washed. The spray arm 8 is rotatably supported close to the centre of the elongated spray arm by a support element 18 secured in the dishwasher to provide the required support for the spray arm 8. Water is fed from the pump 19 via the support element 18 to the spray arm 8. In one end of the spray arm 8 a satellite device 20 is rotatably secured. The satellite spray device 20 is on its upper side provided with a number of nozzles to spray water on the dishing goods when water is supplied from the pump 19. The satellite device 20 improves the spraying characteristics and improves the cleaning since more water is sprayed on the dishing goods in the area of the satellite device 20. Both the spray arm 8 and the satellite device 20 are rotated by the forces generated from nozzles arranged on the spray arm 8 and the satellite device 20 when water is fed from the pump 19 under pressure. Some of the nozzles on the spray arm and the satellite device are directed and dedicated to generate the required rotational force.

The wash zone where intense washing is provided is generated by locking the spray arm 8 in a predetermined position for the wash zone. The spray arm 8 is kept in the locked position for a predetermined period of time. During this period of time water is sprayed continuously from the nozzles on the spray arm 8 and the rotating satellite 20 device to spray water on the dishing goods packed in the wash zone. The satellite device 20 is rotating around an axis substantially parallel to the axis A.

Figures 2A, 2B:
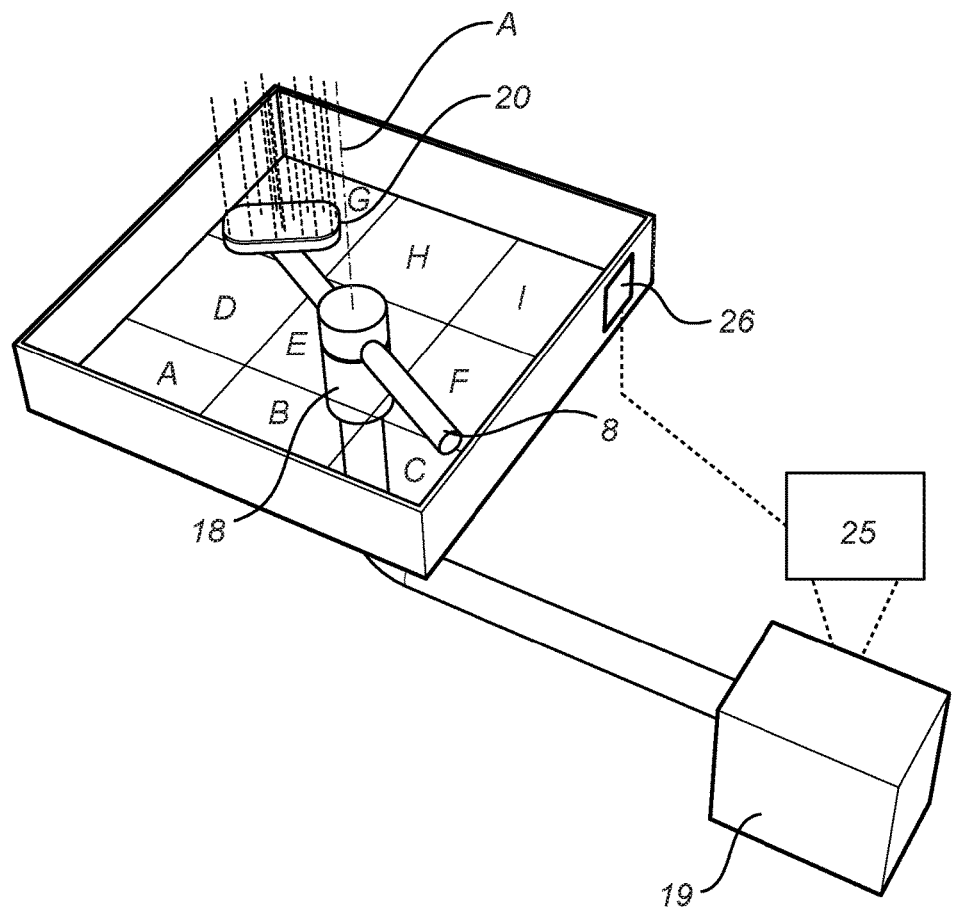
FIG. 2a discloses a spray arm schematically.
FIG. 2b discloses a possible user interface for selecting the wash zone position, or positions.

In FIG. 2a a number of rectangles A-I are illustrated in combination with the spray arm 8 to display the possible selectable positions of the wash zone within the plane of the spray arm 8. The number of selectable position could be adapted to the size and intended use of the dishwasher 10. The minimum number of wash zones is two but preferably more than two positions are offered for selection. The axis A is extending through the centre of rectangle E that not is a selectable position.

In FIG. 2b a possible simple user interface 24 for display on a touch screen is presented. The rectangles and the marking of the rectangles correspond to the one in FIG. 2a and make it possible for the operator to select the desired position, or positions, for the wash zones. Another user interface displayable on the screen makes it possible to select the operational program for the dishwasher before the program is activated.

The user interface preferably is a touch screen to clearly display the selectable options for the operator and make it possible for the operator to do the selection directly on the screen but buttons or levers corresponding to the different possible position are also possible.

The selected position, or positions, in combination with information regarding the selected dishwasher program is communicated to a control unit 25 arranged in the dishwasher 10. The control unit controls the dishwasher operation and operates the different functions and phases of the selected operation program of the dishwasher. The control unit 25 furthermore controls the operation of the water pump 19 for water supply to the spray arm 8, or arms 8, by regulating the speed of the pump 19. A higher speed increases the pressure in the water delivered to the spray arm and vice versa.

The arrangement according to the invention could furthermore comprise position detection means 26 for detecting the position of the spray arm 8 around the axis A. The position detecting means 26 are stationary arranged within the washing chamber 11 to continuously detect the position of the spray arm 8 and communicate the information to the control unit 25. The position detection means 26 could consist of an accelerometer, a microphone, a hall sensor or IR-sensor (image recognition) that continuously detects the position of the spray arm around the axis A and communicates the information to the control unit 25.

As already described the wash zone is created by locking the spray arm 8 in the selected position to provide more intense washing in the selected area of the washing chamber 11. The locking of the spray arm could be achieved in different ways. The different alternatives for locking the spray arm must comply with the selected arrangement for rotating the spray arm 8. For example, in the arrangement described above, the pressurised water in combination with drive nozzles are used to rotate the spray arm 8 and locking arrangement compliant with this arrangement must be used.

An alternative drive arrangement could be to use a separate electrical engine for rotating the spray arm and in this case the control unit stops the power to the engine when the spray arm is in the selected position. A locking arrangement suitable for use in combination with the pressurised water arrangement will be described further down this description.

One embodiment of a support element 18 with a mechanical locking arrangement suitable for use in combination with the pressure driven spray arm 8 is activated when the pressure in the water fed to the support element 18 exceeds a predetermined value.

Based on the selected wash zone position and the detected spray arm position the control unit 25 increases the speed of the pump 19 such that the pressure exceeds the predetermined value and the spray arm 8 is locked in the selected position A, B, C . . . .

However, the pressure in the fed water does not increase immediately since the pump 19 must be accelerated before the pressure is raised in the water flow and the control unit 25, based on the detected position of the spray arm, and the time needed to accelerate the pump 19 determines at which time the pump 19 must be activated to lock the spray arm 8 in the selected position.

The invention furthermore relates to a method for controlling a dishwasher comprising an arrangement as the one described above for creating a wash zone with intensified washing in the washing chamber 11. Dishwasher programs could comprise at least one part in which the spray arm is stopped to create the desired wash zone with intensified washing in the selected position within the washing chamber. Based on the user's selection of program and wash zone, or wash zones, the dishwasher operation program is adapted to the number of wash zones selected by the operator. The fact that the program is extended, or shortened depending on the operator's selections is very favourable since the amount of water could be reduced since the intensified cleaning only has to be done in the areas where it is needed, and in the same way the energy consumption is reduced since only a limit washing is performed in the areas of the washing chamber where the need for washing is low.

The suitable embodiment of the support element 18 for locking the spray arm 8 comprises a first element 40 illustrated in FIG. 3, and a second element 50 illustrated in FIG. 4. The first 40 and second elements 50 are fitted to each other, illustrated in FIGS. 5a and 5b.

The first element 40 is stationary arranged in the washing chamber 11 and the second element 50 movable between a first P1 and second position P2 along the axis A. When the second element 50 is in the first position P1 the second element 50 is free to rotate around the axis A, and when the second element 50 is in the second position P2, vertically elevated in relation to the first position P1, the second element 50 is locked in relation to the first element 40 and prevented from rotating around the axis A.

The second element 50 is initially arranged in the first position P1 either by gravity or a combination of gravity and a spring, not illustrated, arranged to hold the second element 50 in the first position P1. The second element 50 is moved between the first P1 and second position P2 by the force generated from the pressurised water supplied to the spray arm 8 via the support element 18 since the water is supplied in a pipe extending substantially parallel to the axis A from the lower part of the washing chamber 11 upwards to the support element 18 and the spray arm 8 where the water is redirected substantially 90° by a redirection surface, not illustrated, in the support element or the spray arm to continue towards both ends of the spray arm 8 and the satellite device 20. The pressurised flow of water generate a force on the redirection surface and when the pressure from the supplied water exceeds a predetermined level the second element 50 and the spray arm 8 are lifted to the second position P2 and the second element locked in relation the first element.

The described function of the support element is achieved with the first 40 and second element 50 in FIGS. 3 and 4. The first element 40 comprises an elongated pipe 41 arranged coaxially with the rotational axis A. The pipe 41 has a lower end 42 intended to be connected to a water supply pipe from the pump 19, and an upper end 44 of the pipe 41 ended by an annular flange 43 extending first in a substantially radial direction outwards from the upper end 44 of the pipe 41. From the outer end of the radially extending flange 43 an end section 45 is curved downwards.

The second element 50 comprises a pipe-shaped protrusion 51 with an outside diameter corresponding to the inner diameter of the pipe 41 of the first element 40 and intended to be arranged within the pipe 41 of the first element 40. The second element 50 furthermore comprises a second flange 52 with a first part extending radially outwards from the pipe-shaped protrusion outside the annular flange 43 of the first element 40, and a second section 53 extending coaxially to the pipe shaped protrusion 51 downwards from the outer end of the first section 52 to enclose the annular flange 43 of the first section 40.

The length of the second section 53 of the second element 50 exceeds the length of the curved end section 43 of the first element 40 such that the first 40 and second 50 elements are movable in relation to each other along the axis A. The distance between the first P1 and second position P2 is within the range of 5 to 15 mm not to require too much space within the washing chamber 11 which would reduce the packing capacity in the adjacent basket.

When the pressure from the fed water exceeds the predetermined level and the second element 50 in moved to the second position P2 corresponding male/female coupling means arranged on the first 40 and second element 50 are connected to each other and the rotation of the spray arm 8 stopped.

The male/female coupling means could be embodied as a number of cut out 46 portions formed in the curved outer end 43 of the first element 40, and a corresponding protrusion 54 with a shape and size corresponding to the cut out portions 46 in the first element 40 arranged on the inside surface of the enclosing second section 53 such that the second element 50 is stopped from rotation around axis A. The cut out portions 46 are positioned around the periphery of the first element 40 corresponding to the selectable wash zone positions A, B, C . . . . Once the pressure exceeds the predetermined level, the second element 50 will continue its rotation until the position of the protrusion 54 corresponds to the position of the closest cut out portion 46 and the male/female members could be fitted to each other. The cut out portions 46 and the protrusion 54 are positioned such that the satellite spray device 20 is positioned in the intended position for the wash zone when the second element 50 is moved to the second position P2 and the protrusion 54 fitted in the correct cut out portion 46.

The embodiments described above could be combined and modified in different ways without departing from the scope of the invention that is defined by the appended claims.

The invention claimed is:

1. A method for creating a wash zone with selectable position within a washing chamber of a dishwasher comprising a user interface for selecting operation program and wash zone position, a control unit, a water pump arranged to feed water to the spray arm via a support element arranged to support the spray arm in the washing chamber, a spray arm, and position detection means arranged to detect the position of the spray arm around an axis (A), said position detection means being connected to the control unit, said method comprising the steps:
    communicating a selected position of at least one wash zone from the user interface to the control unit; and
    locking the spray arm in the selected position for a predetermined time,
        wherein the pressure in the water fed from the water pump is controlled by the control unit and the support element is arranged to lock the spray arm in the selected position when the pressure in the water fed from the water pump exceeds a predetermined level.

2. The method according to claim 1, wherein the control unit is arranged to control the water pump by increasing or reducing the speed of the pump to stop and start the rotation of the spray arm.

3. A method for creating a wash zone with selectable position within a washing chamber of a dishwasher comprising a user interface for selecting operation program and wash zone position, a control unit and a spray arm, said method comprising the steps:
    a) communicating a selected position of at least one wash zone from the user interface to the control unit; and
    b) lock the spray arm in the selected position for a predetermined time by:
        b1) determining the position of the spray arm around an axis (A) and communicating the position to the control unit;
        b2) increasing the pressure in the flow of water fed to the spray arm above a predetermined level to stop the spray arm in the selected position; and
        b3) maintaining the pressure in the flow of water for a predetermined time.

4. The method according to claim 3, wherein in step b2) the control unit, based on predetermined information regarding the required time to accelerate a pump arranged to feed water to the spray arm, calculates the time at which the pump is activated to stop the spray arm in the selected position.

5. The method according to claim 3, wherein the user interface is arranged to make it possible to select one or more wash zones within the washing chamber.

6. The method according to claim 3, wherein the selectable wash zones are arranged in a plane transverse to the axis (A).

7. The method according to claim 3, wherein the user interface is a touch screen arranged to display graphical symbols enabling the user to select the position of the wash zone.

8. The method according to claim 3, wherein the spray arm comprises a satellite spray device rotatably arranged on the spray arm.

9. The method according to claim 3, wherein the dishwasher further comprises a water pump arranged to feed water to the spray arm via a support element arranged to support the spray arm in the washing chamber; position detection means arranged to detect the position of the spray arm around an axis (A), said position detection means are connected to the control unit; wherein the pressure in the water fed from the water pump is controlled by the control unit and the support element is arranged to lock the spray arm in the selected position when the pressure in the water fed from the water pump exceeds a predetermined level.

10. The method according to claim 9, wherein the control unit is arranged to control the water pump by increasing or reducing the speed of the pump to stop and start the rotation of the spray arm.

11. The method according to claim 9, wherein the position detection means consist of an accelerometer, a microphone, a hall sensor or IR-sensor (image recognition sensor) that is arranged to detect the position of the spray arm around the axis (A) and communicate the information to the control unit.

* * * * *

UNITED STATES PATENT AND TRADEMARK OFFICE
CERTIFICATE OF CORRECTION

PATENT NO. : 10,105,031 B2
APPLICATION NO. : 15/037523
DATED : October 23, 2018
INVENTOR(S) : Dreossi et al.

It is certified that error appears in the above-identified patent and that said Letters Patent is hereby corrected as shown below:

On the Title Page

Item (87) should read:
--(87)  PCT Pub. No.: WO2015/090461
        PCT Pub. Date: Jun. 25, 2015--.

Signed and Sealed this
Fourth Day of December, 2018

Andrei Iancu
*Director of the United States Patent and Trademark Office*